United States Patent
Taylor-Hughes

(10) Patent No.: US 10,259,302 B2
(45) Date of Patent: Apr. 16, 2019

(54) COVER

(71) Applicant: Robert Taylor-Hughes, London (GB)

(72) Inventor: Robert Taylor-Hughes, London (GB)

( * ) Notice: Subject to any disclaimer, the term of this patent is extended or adjusted under 35 U.S.C. 154(b) by 113 days.

(21) Appl. No.: 14/771,930

(22) PCT Filed: May 1, 2014

(86) PCT No.: PCT/GB2014/000168
§ 371 (c)(1),
(2) Date: Sep. 1, 2015

(87) PCT Pub. No.: WO2014/177827
PCT Pub. Date: Nov. 6, 2014

(65) Prior Publication Data
US 2016/0121705 A1    May 5, 2016

(30) Foreign Application Priority Data

May 1, 2013    (GB) .................................. 1307846.4
Dec. 6, 2013    (GB) .................................. 1321557.9

(51) Int. Cl.
| | |
|---|---|
| B62J 19/00 | (2006.01) |
| B60J 11/00 | (2006.01) |
| E04H 15/06 | (2006.01) |
| E04H 15/54 | (2006.01) |
| E04H 15/64 | (2006.01) |

(52) U.S. Cl.
CPC ............... B60J 11/00 (2013.01); B62J 19/00 (2013.01); E04H 15/06 (2013.01); E04H 15/54 (2013.01); E04H 15/64 (2013.01)

(58) Field of Classification Search
CPC .. B60J 11/00; B60J 11/06; B60J 11/02; B60R 1/06; B64F 1/005
USPC ........ 150/166, 167, 106; 296/136.04, 136.08, 296/77.1, 78.1, 219.11; D12/401, 402
See application file for complete search history.

(56) References Cited

U.S. PATENT DOCUMENTS

| | | | | |
|---|---|---|---|---|
| 4,355,649 A | * | 10/1982 | Deragon ................. | E04H 15/06 135/88.13 |
| 5,562,139 A | * | 10/1996 | Cseri ....................... | B62J 19/00 150/167 |
| 5,676,288 A | | 10/1997 | Spirk | |

(Continued)

FOREIGN PATENT DOCUMENTS

| | | |
|---|---|---|
| CN | 2 166 061 | 4/1994 |
| CN | 200977844 Y * | 11/2007 |
| CN | 102039962 | 5/2011 |

Primary Examiner — Fenn C Mathew
Assistant Examiner — Cynthia F Collado
(74) Attorney, Agent, or Firm — William H. Bollman

(57) ABSTRACT

It is often desirable to cover parts of a roofless vehicle when not in use, for example to protect the seat and instrumentation from the weather or becoming damaged. The cover (10) for a roofless vehicle comprises two portions (101,102) with a first portion arranged to be placed in use over the vehicle's instrumentation and steering and a second portion arranged to be placed in use over a seat of the vehicle. The cover can be arranged in a first configuration to cover the vehicle and rearranged to a second configuration wherein the cover provides a shelter. The cover includes plural attachment points (13,14) to allow the cover to be secured in both configurations.

14 Claims, 18 Drawing Sheets

(56) References Cited

U.S. PATENT DOCUMENTS

| | | | | |
|---|---|---|---|---|
| 5,795,009 | A * | 8/1998 | Sack | B62J 19/00 |
| | | | | 150/167 |
| 5,921,389 | A * | 7/1999 | Zoffer | B60J 11/00 |
| | | | | 150/167 |
| 6,209,599 | B1 * | 4/2001 | Richardson | B62J 19/00 |
| | | | | 150/167 |
| 6,516,844 | B1 * | 2/2003 | Henry | B62J 19/00 |
| | | | | 150/166 |
| 6,923,489 | B2 * | 8/2005 | Keys | B62J 17/02 |
| | | | | 296/136.07 |
| 7,416,250 | B1 | 8/2008 | DiFilippo | |
| 7,513,559 | B2 | 4/2009 | Ohzono | |
| 8,136,865 | B1 * | 3/2012 | Beck | B62J 17/02 |
| | | | | 296/136.01 |
| 9,061,722 | B2 * | 6/2015 | SanCartier | B62J 19/00 |
| 2004/0050410 | A1 * | 3/2004 | DeLong | E04H 15/06 |
| | | | | 135/88.13 |
| 2006/0284444 | A1 * | 12/2006 | Wall, II | B60R 13/00 |
| | | | | 296/136.07 |
| 2009/0025843 | A1 * | 1/2009 | Keeler | B62J 19/00 |
| | | | | 150/167 |
| 2011/0148138 | A1 | 6/2011 | Penman | |

* cited by examiner

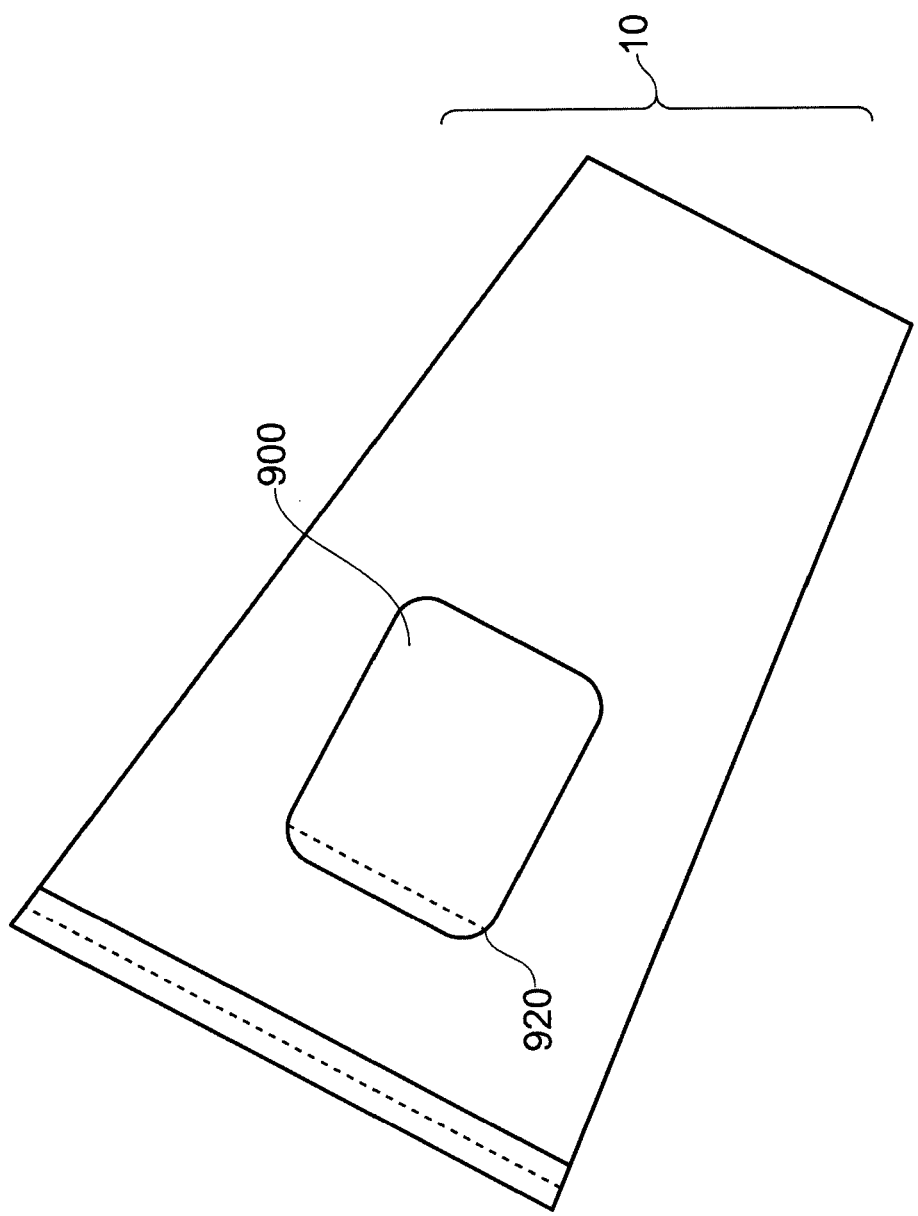

COVER

FIELD OF THE INVENTION

The present invention relates to a cover, more particularly a cover for a roofless vehicle that can be reconfigured to provide a shelter.

BACKGROUND

Many users of roofless vehicles such as motorcycles, powered water crafts (PWC) such as Jetskis®, tricycles, motorcycles, bicycles, buggies or all-terrain vehicles such as quad bikes, like to protect their vehicle with a cover when not in use. In particular a user may wish to protect the seat, steering and instrumentation so as to protect them from the elements therefore better maintaining condition of the vehicle. Additionally a cover may serves as a deterrent; prevent people from sitting upon the vehicle.

Traditional covers may serve to cover the entire vehicle and can be bulky making them difficult to store when not in use. Furthermore such covers may scratch and damage paintwork. These traditional covers can also be difficult to clean if they become soiled and can be caught by the wind, so destabilising the vehicle and in some cases setting off vehicle alarms.

Users of roofless vehicles often like to travel and camp. However, such vehicles typically have limited storage capacity, therefore carrying a bulky cover, travelling and camping equipment can be problematic. The user is therefore limited by the amount of equipment which can be carried on the vehicle; and it may not be possible to carry the cover with the user. As a result separate covers may be needed at each destination or the vehicle can only be covered whilst at a certain location.

The present invention serves to overcome this problem by providing a cover that protects seats, steering equipment and instrumentation that can also be reconfigured to provide a shelter.

PRIOR ART

A number of patent applications have been filed in an attempt to resolve the problem or similar problems. These include the following:

U.S. Pat. No. 7,513,559 (OHZONO) discloses a vehicle comprising: a cover member including: a flexible cover body section arranged to cover at least a portion of an on-the-vehicle part; and a bendable elongated section extending outward from an edge portion of the cover body section.

Chinese utility model CN 2 166 061 (FENGFU) relates to a motorcycle accessory, particularly a protective cover for a motorcycle, which is composed of two trapezoidal side surfaces, a larger front end face, a smaller rear end face and a trapezoidal top surface, wherein, the lap of each surface is provided with a plurality of small holes which are perforated with elastic bands. The device has the advantages of easy manufacturing, low cost, small size, convenient use and convenient collection. When the utility model is used, the lap can be automatically fastened and cannot be raised by wind.

U.S. Pat. No. 7,416,250 (DIFILIPPO) discloses a covering means for protecting a motorcycle seat and its underlying electrical components from liquids and chemical cleaning compounds comprising: a) protective means comprising a pliable sheet encompassing top and sides of said motorcycle seat to prevent contact with contaminants; b) retaining means for retaining said covering means upon placement by a user on said motorcycle seat; and c) said retaining means comprising an adhesive layer on an underside of said pliable sheet extending inwardly and beyond a peripheral edge of said seat and an annular elastic band in direct contact with said seat solely through an adhesive layer.

U.S. Pat. No. 6,516,844 (HENRY) discloses a sunscreen protector for motorcycles that covers the seat and fuel tank area to protect these components from the deteriorating effects of sunlight.

Chinese patent application CN102039962 (CHANGCHUN) reveals a rain cover which is provided with button magnets for securement to a bicycle.

U.S. Pat. No. 5,676,288 (SPIRK) shows a portable protective cover for a bicycle adapted to be connected to the handle bars and seat of a bicycle.

United States patent application US2011/148138 A1 (PENMAN) discloses a recreational vehicle cover which is compact and easy to use. The cover has an attached storage pouch and remains attached to the vehicle during use.

United States patent application US 2009/025843 A1 (KEELER) reveals a removable protective vehicle cover for motorcycles and similarly designed vehicles for protecting the upper surface of the vehicle from the elements.

SUMMARY OF THE INVENTION

According to a first aspect of the present invention there is provided a cover for a roofless vehicle, the cover is adapted to be arranged in two configurations: a first folded configuration in which a first portion is placed, in use over, instrumentation and steering equipment of the roofless vehicle; and a second portion is arranged to be placed, in use over, a seat of the roofless vehicle, a plurality of attachment points and a securement means for maintaining the cover in the first folded configuration; and a second configuration, in which the cover is unfolded by separation of the securement means to increase surface area of the cover so as to provide a shelter beneath which persons or objects can be sheltered, wherein the attachment points are used to secure the shelter to the roofless vehicle, and/or another object or a structure.

The type of roofless vehicle may include but is not limited to a motorcycle, an all-terrain vehicle such as a quad bike or mule, a powered water craft (PWC) such as a Jetski® or a buggy.

In this way a cover can be arranged in the first configuration over part of the vehicle so as to provide protection to the vehicle and to deter or prevent unauthorised use of the vehicle.

The cover can also be arranged in the second configuration to provide a shelter under which items, people or animals can shelter from the elements.

Advantageously in the second configuration part of the cover may be attached to the vehicle and part of the cover is secured away from, or above the vehicle by for example being attached to an object such as a tree or structure, or being secured to the ground. In this way an area is created under the cover to provide the shelter.

In order to attached the cover to the ground the cover may be provided with a set of lines/guide ropes and pegs/weights so as to allow the cover to be attached to the ground on the unattached side by use of lines/guide ropes/pegs via one or more attachment points.

Furthermore this may allow a user of the roofless vehicle such as a motorcyclist to shelter under the cover alongside their motorcycle for enhanced security, as they are in the immediate proximity of the vehicle.

It may be envisaged that in some embodiments the user may arrange the cover in the form of the shelter so that it is not in contact with the vehicle.

In preferred embodiments the cover is provided in a folded arrangement. For example the cover may be folded in half having the sides secured, therefore having two layers and capable of being unfolded to provide a larger surface area. In this way the folded arrangement may be of sufficient size to cover and protect key parts of the vehicle—instrumentation, steering equipment, seats. The cover can then be unfolded to provide a larger surface area to provide a shelter.

Typically the cover is substantially trapezoidal. Preferably the portion of the cover passing over the steering equipment and instrumentation may be wider than the second portion covering the seat region.

In some embodiments the cover may be substantially rectangular wherein each end is of the same width. For example for a vehicle that has more than one seat arranged in a row such as for an all-terrain mule.

In other embodiments the cover may be shaped to have a waist region between the first and second portions so as to taper at a mid-region. For example the waist may be pinched or arcuate in order to correspond to the vehicle.

Advantageously this may more closely represent the shape of the vehicle, for example to be wider to protect steering equipment and instrumentation and to narrow over the seat region and extend again at the second portion.

Typically the cover is a flat sheet. In some embodiments the cover may be shaped to accommodate the three dimensional shape of the vehicle. For example the cover may include darts or an arcuate region adapted to cup a seat.

The folded arrangement is secured by securement means which are arranged to maintain the cover so as to be folded having two or more layers. Said securement means therefore ideally involve the joining of a plurality of edges or sides of the cover so as to secure the cover in the folded arrangement.

For example the cover may be folded in half so as to have three free edges that are secured by securement means so as to prevent unfolding of the cover and to maintain the cover in a constant form.

The securement means are used to secure the layers when the cover is folded and may include but are not limited to zippers, push fittings, buttons, magnetic means, clips or hook and loop means such as Velcro®.

Ideally the securement means may be covered when in use so as to prevent the vehicle becoming scratched or damaged in anyway. For example the zipper may be covered by a flap of material or located in a pocket that conceals the zipper and prevents it coming into contact with the vehicle.

The securement means allow the folded arrangement to be maintained in use wherein plural edges of the cover are prevented from flapping or displacing.

In preferred embodiments a plurality of attachment points are provided on the cover so as to enable the cover to be secured to the vehicle. Typically the attachment points are arranged around edges of the cover and preferably at least one attachment means is provided at each corner of the cover in both folded and unfolded arrangements.

For example in some embodiments the attachment points are arranged on a peripheral part of the cover and securement means arranged on an interior part and act to secure the folded arrangement intermediate the edges, leaving a peripheral strip containing or surrounding the attachment points.

Preferably the attachment points or points are for accepting a line and/or connectors.

The attachment points are strong and durable. The attachment points may be formed from synthetic material such as durable webbing or may be formed from the same material as the cover.

In some embodiments the attachment points may include an elasticated portion or be comprised from an elasticated material so as to allow the cover to easily be pulled taut whilst still allowing some give, for example during a gust of wind.

The attachment points may allow through-passage of lines such as ropes or cords or the line may be integrated with the attachment point.

The connectors may include clips, hooks, karabiners or pegs, allowing multiple usages and consequently multiple arrangement possibilities for the cover. In some embodiments the connector may include a swivel joint so as to allow rotation without twist the line and/or cover. For example the connectors may comprise a clip means to enable connection so the connector can be clipped to the attachment point and/or so that connector can be clipped about the line after being passed around an object.

The connectors may connect directly to the attachment points or may be attached to one or both ends of the line. In this way the line can be easily connected to the attachment point and to the free end can be secured about the vehicle, an object or the ground using the connector. As mentioned above a variety of connectors may be provided so as to accommodate different uses.

The connector may be integrated with the attachment point and or the line.

In some other embodiments the line may be removable so as to allow different lines to be used on the attachment points depending upon the vehicle and configuration of the cover.

In preferred embodiments each attachment points may comprise a loop, aperture or catch through which a line can be passed in order to attach the cover to the vehicle.

The attachment points may include or comprise eyes and/or hoops for accepting the line and/or connectors.

For example a metal or synthetic plastic eye may be provided on the attachment point so as to reinforce the cover and to provide a strong point for attachment. Advantageously this enables the cover to be arranged so as to be taut without causing damage to the cover, which prevents pooling of water or collection of debris for example from falling leaves.

In some embodiments the attachment point may include more than one line and/or more than one connector.

In some embodiments the connectors may be detachable so as to be readily interchanged for different uses.

By adjusting/altering length of the line it is possible to be able to tension the cover to ensure it is fixed securely to both first and second configurations.

The line may be adjustable by means of a buckle or adjustor toggle so as to alter length in order to best fit the vehicle or object to which the cover is secured, ensuring the cover is held taut. In some other embodiments the lines may be retractable or reeled.

Line length and type may also be specific for the vehicle, or the line may be adjustable so as to be fitted to different vehicles. In some embodiments lines may be designed for a particular vehicle wherein the line is of a particular length and includes particular connectors to fit the vehicle and or object to which the cover is secured.

The lines may be elasticated or include an elasticated portion, for example a bungee cord. In this way the line can be easily adapted to different vehicles and the line has a degree of stretch so if for example a gust of wind were to lift the cover it is less likely to be broken.

Preferably the lines may be comprised from strong, durable materials that cannot easily be cut so as to prevent likelihood of unauthorised removal from the vehicle.

In some embodiments each line may include sheath to prevent the line from damaging the vehicle and which in some embodiments may make the line harder to cut. For example the line may comprise a metal wire coated in a synthetic plastic sheath.

In some embodiments the cover may be secured using locks so that once attached they cannot be detached without unlocking. For example a padlock or combination lock may be used to secure an attachment point to the vehicle.

Ideally the attachment points are provided as pairs so that the line can be passed and attached from one attachment point to the corresponding second attachment point typically having been passed through or under part of the vehicle, thereby attaching the cover to the vehicle.

In some embodiments the cover may be provided with lines attached or integrated to the attachment points. In this way the lines are less likely to be lost and the motorcycle may be readily covered and is prevented from lifting off the motorcycle for example due to the wind.

In some other embodiments the attachment points may include magnetic means so as to allow the cover to be magnetically attached to the vehicle.

Additionally or alternatively attachment points may be provided to allow one part of the cover to be joined to another part of the. For example to allow the edges to be maintained in a folded arrangement, or to allow one cover to be attached to a second cover.

In another embodiment the attachment points may comprise displaceable fittings that can be attached to the cover at any desired location. In this way the displaceable fittings can be readily moved about the cover to correspond to the vehicle and configuration.

For example the displaceable fitting may have a clamp for attachment to the cover.

It may be envisaged that some attachment points may not be available when the cover is arranged in the first configuration but may be available when the cover is provided in the second configuration.

For example the attachment points may be arranged on the cover so that they are concealed if the cover is folded and revealed when the cover is unfolded to provide a shelter.

In some embodiments the attachment points may be arranged so as to correspond with other attachment points when folded. For example so that a line can be passed between, and secured between, two corresponding attachment points.

In some other embodiments the attachment points may be attached directly to the vehicle. For example embodiments the attachment point may include a break so that it can be placed around, for example, the handlebars or wing mirrors and secured. For example the loop may include a buckle, clip or be comprised from hook and loop means such as Velcro® so as to be directly attached and detached to structures as required.

It is a feature of the present invention that type of attachment means, line and connector can be selected and altered to the user's specification. In this way the cover can be adapted to a particular vehicle or environment.

In preferred embodiments the cover is provided in a first configuration wherein the cover is folded. Typically the cover is folded in half.

Ideally the cover is unfolded, by releasing the securement means, in order to provide a larger cover that provides a shelter when arranged in the second configuration.

Typically the cover is rearranged on the vehicle so that either the first or second portion is connected to the vehicle and the portion not attached to the vehicle is secured to an object and/or to the ground. In this way the cover provides a shelter under which a person, animal or items can be stored and sheltered from the elements.

In some other embodiments the cover may be arranged in the form of a tent when provided in the second configuration. Advantageously this may provide improved protection from the elements.

In some preferred embodiments the cover may include end flaps so as to provide an enclosed tent. Typically the end flaps are folded away so as to not be visible when arranged as a cover but that can be unfolded when arranged in the form of a tent to close off each end of the tent. In this way the user may be fully enclosed within the tent whereby the end flaps may be displaced in order to gain access or to exit the tent.

Typically two end flaps are provided on each portion of the cover therefore providing an opening with two evenly sized end flaps that serve as a closable opening.

Preferably the end flaps are triangular having one side attached to the cover and two unattached sides. The unattached end flaps include securement means so as to allow one end flap to be attached to another thereby providing closing means. For example the unattached edges may have corresponding zips or hook and loop means such as Velcro®.

The cover when arranged in the form of the tent may be attached in place by using the attachment points. For example attachment points may be used to secure the tent to the ground.

In order to maintain the tented structure a cable may be positioned to pass along the fold line/crease line that is the tent apex in use.

The cable may be attached to the ground at one end and to the vehicle or another structure such as a tree at its opposite end, therefore being secured at a position above ground so as to enable the cover to be arranged as the tent.

In some embodiments the cable may be integrated with the cover for example being arranged or carried in a channel along said fold line/crease line. In other embodiments the cable may be secured along the fold line by means of specific connectors for the cable such as loops for locating the line, hooks or clips positioned along the crease.

In other embodiments the cable may be separate or independent from the cover wherein the cable is positioned first and the cover then arranged over the cable, for example the tent being draped over the cable.

The cable and any attachment points, lines of connectors that require attachment to the ground may be attached by means of pegs or stakes. In some embodiments weights may be provided to attach the cover to the ground if use of pegs is not possible, for example on hard ground such as concrete.

In an embodiment deigned for a motorcycle the cover is dimensioned to cover the motorcycle instruments, seat and fuel tank. In this way the cover serves to protect the before mentioned parts from being soiled and from damage associated with the weather, for example rain damage leading to rust or excessive heat from the sun on the fuel tank.

In some preferred embodiments the first portion of the cover is attached to wing mirrors, handle bars or indicator lights.

On some vehicles wing mirrors remain are independent of the steering equipment. Therefore, advantageously, a steering lock can be activated without affecting the cover. By attaching the cover in this way the cover can be maintain in a taut fashion to prevent the pooling of rain or distortion caused by wind so as to ensure optimal protection of the vehicle.

In some vehicles steering causes movement of the wing mirrors. In such embodiments the cover is adapted so that it can be adjusted to compensate for the altered position of the wing mirrors so that the cover remains taut. Typically this may be achieved by part of the cover being folded back and secured to itself and/or the cover being secured to the mirror by means of an alternative attachment point. Preferably the part of the cover that is folded back may be secured against the cover so as to prevent flapping. For example the part of the over may be secured by means of hook and loop means such as Velcro®.

In preferred embodiments the cover may be formed from a lightweight, flexible, durable, waterproof, windproof material such as synthetic fabrics such as Gore-Tex®, Nylon® or canvas.

In some embodiments the cover's face exposed to the vehicle in use may include or comprise anti-scratch material so as limit or prevent any damage to the vehicle. For example the face exposed to the vehicle may be coated in a layer of anti-scratch material.

Advantageously the cover is flexible and lightweight enough to be further folded or scrunched into a pouch when not in use so as to be readily carried by a user. Ideally therefore the securement means are also flexible, deformable or displaceable so that even when in use with the cover in the folded arrangement said means allows the cover to be folded or compressed further.

In some embodiments the cover may be adapted to be strapped to the user when in a stowed arrangement, for example being secured around the user's waist. It may be envisaged that the attachment points/lines/connectors may be adaptable to facilitate attachment of the cover to the vehicle, to an object or to the user. In this way when the cover is not in use it may be readily stored in a fixed position to prevent it becoming lost and to ensure it is easily accessible when required.

In other embodiments the attachment point may be adapted to fit over part of the vehicle. For example the cover may include a pouch adapted to receive a wing mirror, handle bar or indicator light so as to be secured to the vehicle. The pouch may be lined with anti-scratch material so as to prevent damage to the part of the vehicle to which it is attached.

Furthermore the pouch may also be suitable for receiving the cover when not in use, for example wherein the covered is scrunched into the pouch. In this way the cover can be packed into the pouch in order for it to be compacted for easy storage and transportation.

The pouch has an opening through which the wing mirror or other object is received. In some embodiments the opening may be adjustable so as to be reduced or closed if required. Advantageously this may allow the pouch to be securely fitted to the vehicle and allow the cover to be stowed securely within the pouch. For example the pouch opening may be elasticated so as to allow the opening to be stretched in order to fit about the wing mirror.

In other embodiments the pouch may include a zipper so as to opened and closed by zipper.

In some embodiments the pouch is divided into sections so as to have one section for holding the cover and a second section for fitting over part of the vehicle. For example the pouch may include a flexible fabric divider so as to have one section for receiving the cover and a second section for receiving the wing mirror.

In some embodiments the pouch may include straps or loops so as to enable securement of the pouch to the wing mirror, object and/or user. For example the loops may be elasticated so as to enable the loops to be stretched and fitted about the wing mirror or an arm of the user.

In some embodiments the pouch may be integral with the cover so that the cover can be readily tucked into the pouch without requirement for the pouch to be carried separately for example wherein the pouch comprises an invertible corner of the cover.

In some further embodiments the cover may be divided or divisible so as provide smaller parts. These parts may be apportioned between plural pouches.

In preferred embodiments the cover may include decoration on an outward facing face, for example so as to display text or an image. Preferably the cover is capable of being printed upon or stitched upon so as to allow a user, manufacturers or retailers to personalise the cover. For example the cover may be screen printed or the material used for the cover may be created to include the decoration. In this way the cover may include text, patterns or images, such as a logo for advertising and/or chosen designs such as a photograph so as to personalise the cover.

In some embodiments one face of the cover may include a wallet for accepting an item such as a sheet of paper or a card. Preferably the wallet may be transparent or be formed from a mesh so that the item contained within the wallet can be viewed.

For example the wallet may be used for displaying a permit, service document, for sale sign or other form of notification.

The wallet may be sealable so as to prevent escape or removal of the item held within. For example the wallet may have a zip or push fit.

In some embodiments the wallet may be stitched or glued to the cover so as to be permanently fixed in position.

In other embodiments the wallet may be displaceable, for example being attached to the cover by means of a zip, push fittings, clips, press studs or hook and loop means such as Velcro®.

In preferred embodiments the user may be able to choose a design they wish to be displayed on the cover so as to personalise the cover. Personalisation of the cover may aid the user in identifying their vehicle in an area crowded with plural vehicle.

Furthermore the user may have the option of choosing further personalisation of the cover such as the material from which it is made. The material may be selected so as to be suitable for different conditions. For example heavier weight materials may be used in more extreme climates such as extreme heat or cold. In this way the cover may have improved durability and may provide greater protection to the roofless vehicle when used as a cover and greater protection of users or objects stored under the tented arrangement.

The colour of the cover may also be selected to correspond to the vehicle, branding and/or personal preferences of the user or to correspond to the surrounding environment, for example so as to camouflage the vehicle, such as if hunting.

The user may also be able to select attachment means and securement means. For example choosing the number and location of attachment means and/or how the cover is secured when folded for example by zip or hook and loop means.

Therefore it may be envisaged that the cover is offer for sale with the option of user selection of materials, attachment means, securement means and decoration. In this way the cover can be tailored to the user's requirements and preferences.

Furthermore the cover may be available in different colours, for example to coordinative with the vehicle.

Advantageously when the cover is fitted it may serve as a deterrent to prevent persons other than the user from using, operating the vehicle, for example preventing an unauthorised user from sitting astride or in the vehicle, leading to damage or triggering the vehicle alarm.

In preferred embodiments the cover is dimensioned to cover only a section of the vehicle so as to protect key parts of the vehicle, and in this way the cover is of minimal size and can be readily fitted and associated damage, for example scratching to paintwork, is minimised.

Preferred embodiments of the invention will now be described, by way of example and with reference to the Figures in which:

BRIEF DESCRIPTION OF FIGURES

FIG. 8A shows a cover with a wallet for receiving documents;

FIGS. 14A-14E show different views of a cover fitted to a quad bike.

DETAILED DESCRIPTION OF FIGURES

Figure 1:
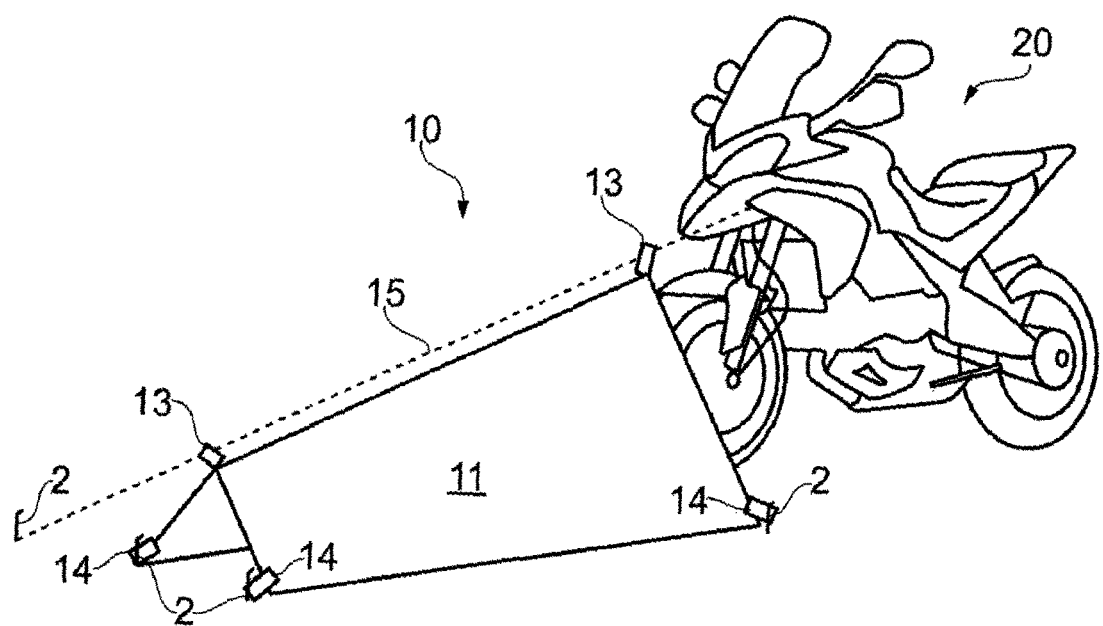
FIG. 1 shows a cover deployed from a motorcycle in the second configuration.

With reference to FIG. 1 shows a cover 10 is provided for covering a motorcycle 20. The cover 10 is shown in the second configuration wherein the cover is provided as a shelter connected to the motorcycle.

The cover has attachment points 13, 14. The attachment points 13, 14 allow the cover 10 to be secured in position.

Figure 3A:
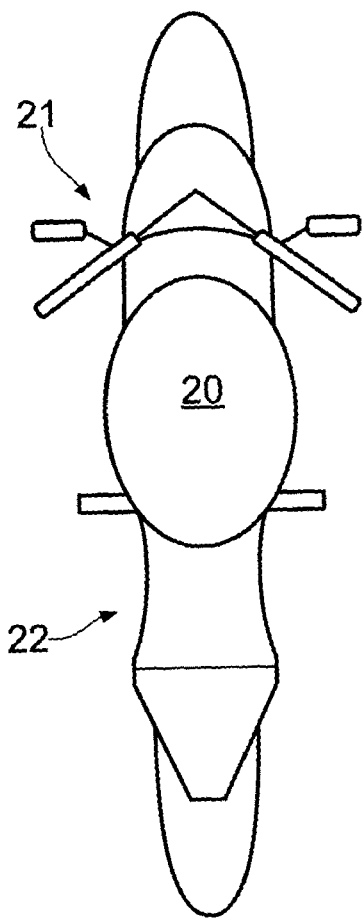
FIG. 3A show two views from above of a motorcycle with no cover.
Figure 3B:
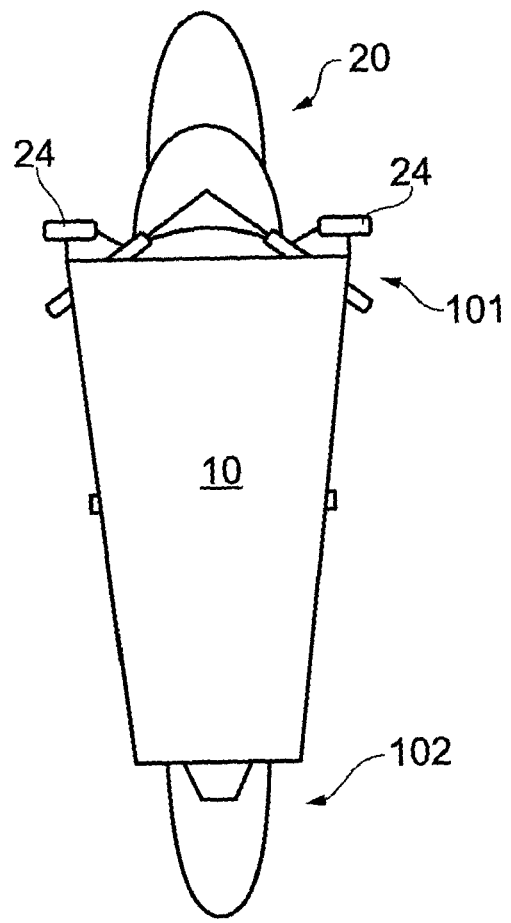
FIG. 3B shows a motorcycle with a cover fitted.

Attachment points 13 are provided on an edge of the first portion 101 and an edge of the second portion 102. Therefore an attachment point 13 is provided at each end of the cover. The attachment points 13 also correspond to the crease along which the cover is folded when used as a cover for a vehicle in the first configuration. Therefore the portions 101, 102 correspond in a folded arrangement with the motorcycle handlebars and/or instrumentation 21 and seat 22 (FIG. 3A, FIG. 3B).

In FIG. 1 shows attachment points 13 accepting a cable 15 which is attached to the motorcycle at one end and to the ground at the second end by a peg 2.

Four attachment points 14 are all attached to the ground by pegs 2 in order to secure the cover to the ground in order to provide the shelter.

Figure 2A:
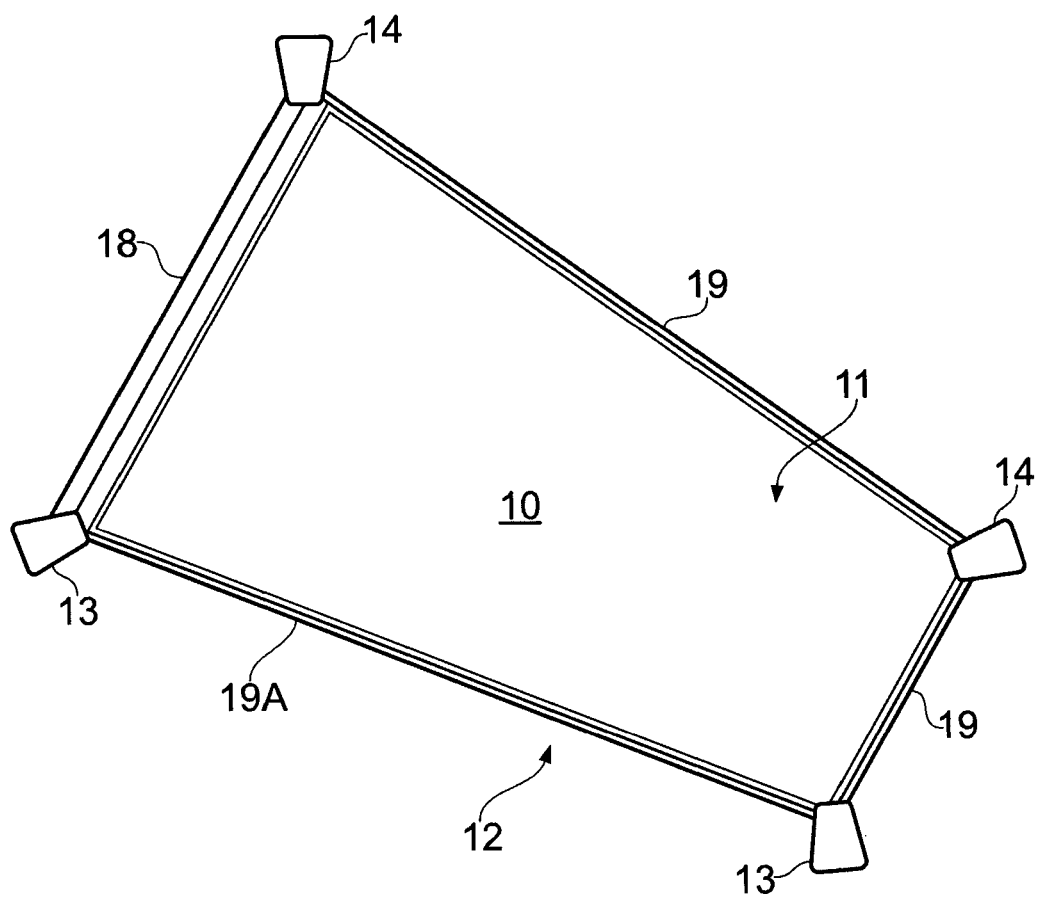
FIG. 2A shows a detailed view of the cover shown in FIG. 1 when arranged in the first configuration.
Figure 2B:
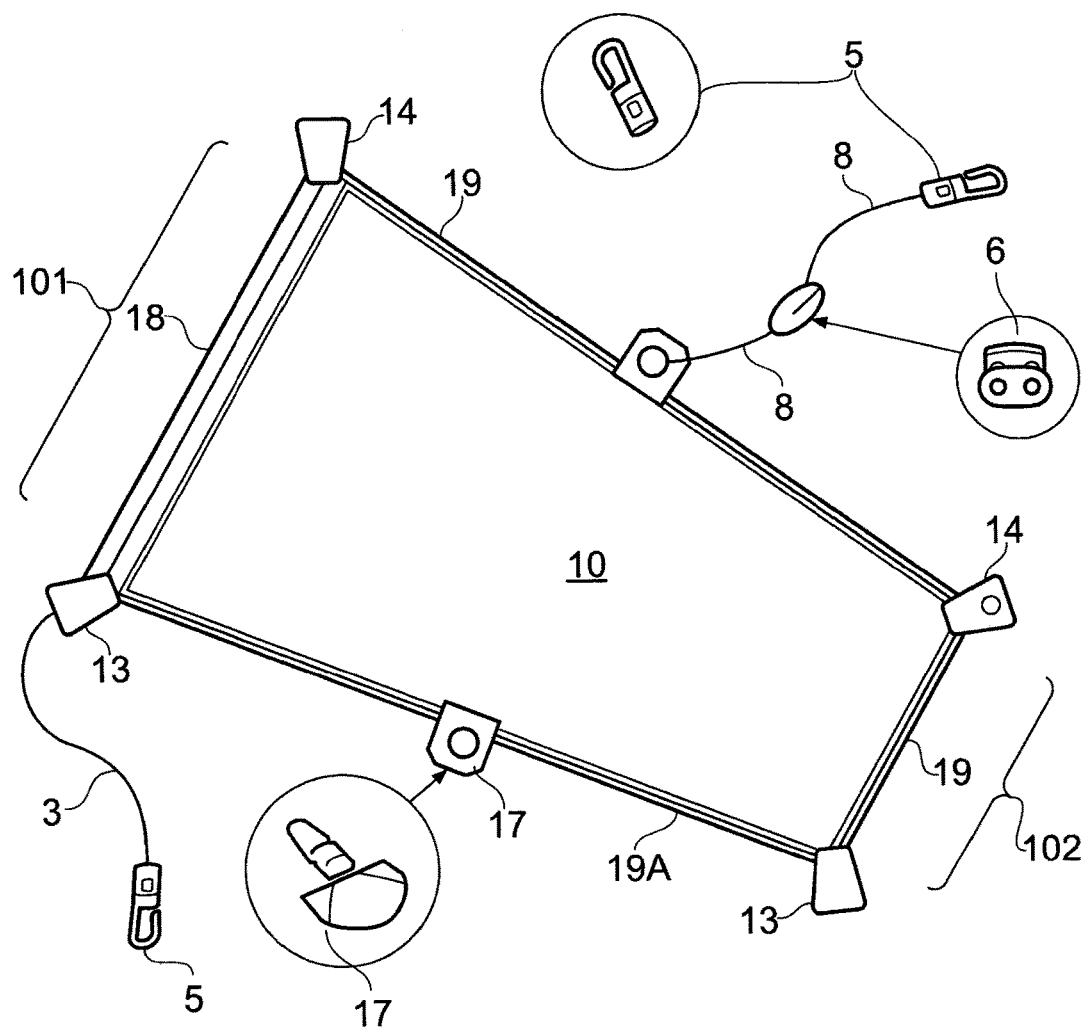
FIG. 2B shows a detailed view of the cover shown in FIG. 1 when arranged in the first configuration including lines.

FIG. 2A and FIG. 2B show a preferred embodiment of the cover in a folded arrangement. The cover comprises a securement means comprising zippered edges 19, which allow mutual engagement to maintain the layers 11, 12 in a close folded arrangement. There are three zippered edges 19 with the fourth side being the fold line/crease line 19A.

Two attachment points 13 are provided, one either end of the fold line.

Four attachment points 14 are provided on the cover, one at each corner of the cover when in its unfolded arrangement. Therefore in FIG. 2 wherein the cover 10 is folded there are two attachment points 14 arranged adjacent to one another.

The cover shown in FIG. 2B also includes 2 attachment points 17 arranged at a mid-point on an edge of the covered in the folded arrangement. The attachment points 17 are intermediate the first portion 101 and the second portion 102.

The attachment points 17 are displaceable so as to clipped on to the cover and removed as and when required. The attachment point 17 comprises a clamp that can be removable clamped to the cover at any position. Advantageously this allows the user to select positioning of the attachment points to best suit vehicle, object, ground etc.

The attachment points 13, 14 or 17 can receive a line 3 and/or an adjustable line 8. Adjustable line 8 includes an adjustor toggle 6 that allows line length to be altered. The lines 8 may be provided as doubled and/or extendable lines 8, with one or more adjustor toggles 6.

The lines 3, 8 enable the cover 10 to be secured, either by securing to a vehicle, an object or to the ground.

The lines 3, 8 are threaded through the attachment points 13, 14, 17 in order to be connected to the cover.

The free end of the line 3, 8 has a connector 5. The connector is a clip. In this way the line can be passed around part of the vehicle, or an object and either clipped to another connector or returned and clipped around the line thereby securing the cover 10 to the vehicle 20.

The connectors 5 may be displaceable and/or interchangeable. For example the connector 5, may be exchanged for a peg 2.

The instrumentation portion 101 shown in FIG. 2 includes a toughened edge 18, for minimising flapping. The toughened edge 18 also conceals the zippered edge 19 preventing it from scratching or damaging the vehicle in use.

The toughened edge 18 may include magnetic portions or other attachment mechanism to allow elongate attachment to the vehicle 20.

FIGS. 3A and 3B show a top view of a motorcycle with no cover (FIG. 3A) and with a cover (FIG. 3B).

The cover is attached to the motorcycle 20 at the wing mirrors 24 and passes over the instrumentation 21, and seat 22.

Figure 4A:
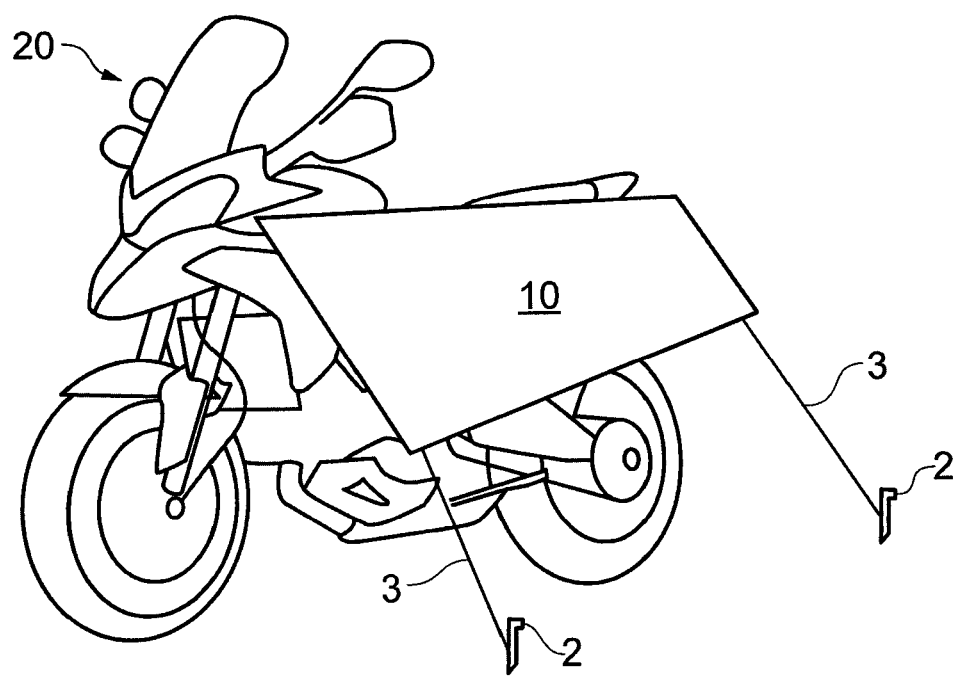
FIG. 4A shows an overview view of the cover as shown in FIGS. 2A and 2B in use on a motorcycle wherein the cover is folded.

FIG. 4A shows the cover arranged on the motorcycle 20 in the second configuration wherein the cover serves a shelter. In FIG. 4A the cover remains in the folded arrangement providing a shelter that extends from the motorcycle 20 and is secured to the ground by two lines 3 and two pegs 2.

Figure 4B:
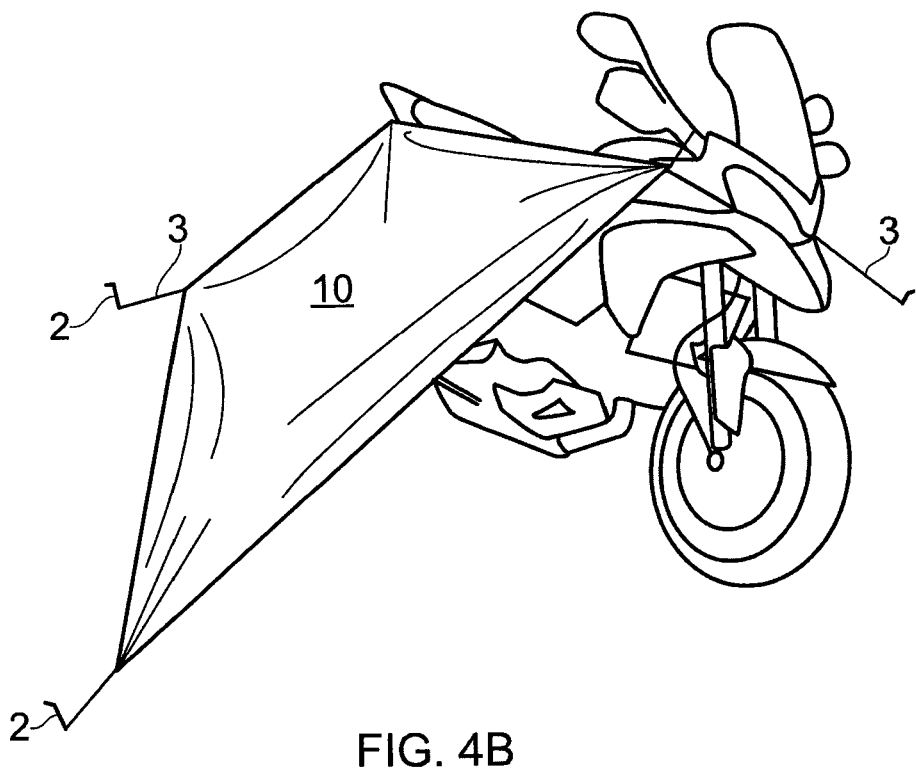
FIG. 4B shows an alternative view of the cover as shown in FIG. 4A wherein the cover is unfolded to provide a larger shelter.

FIG. 4B shows the cover in the unfolded arrangement in the second configuration, therefore providing a larger shelter as the cover 10 has been unfolded to cover a larger surface area. A line 3 also extends from the motorcycle 20 on an opposite side to the cover 10 in order to pull the cover 10 taut and to ensure it is most secure.

Figure 5:
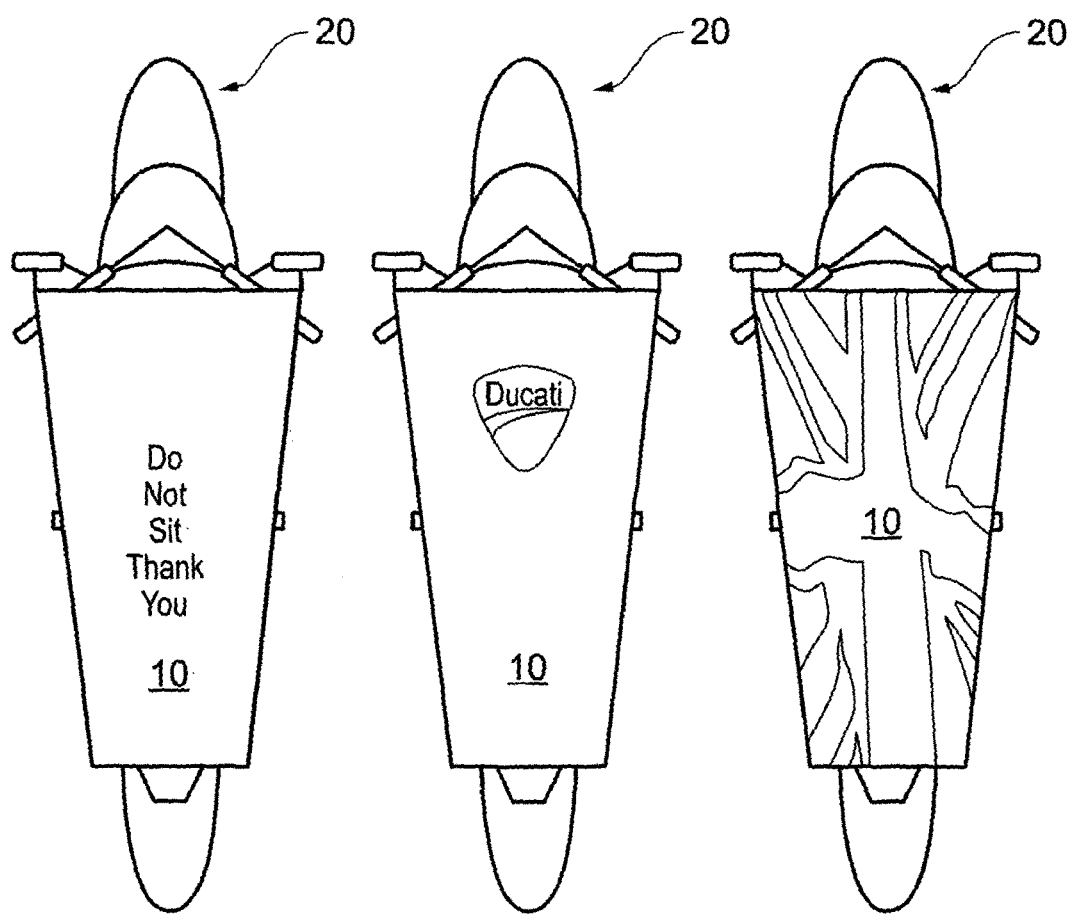
FIGS. 5A, 5B and 5C shows three versions of the cover fitting to motorcycles, each cover having a different design.

FIGS. 5A, 5B and 5C show three covers, each having different decoration on the outward facing face. FIG. 5A includes a warning to request people not to sit on the motorcycle 20. FIG. 5B shows a cover including a logo and FIG. 5C shows a cover having a Union Jack flag motif.

The cover 10 is printed with text and/or an image so as to alter appearance of the cover 10. The decoration is printed on the cover, for example by screen printing. Decoration of the cover allows for branding/advertising to be displayed, patterns, instructions to be provided, or other information to be included and displayed.

Figure 6A:
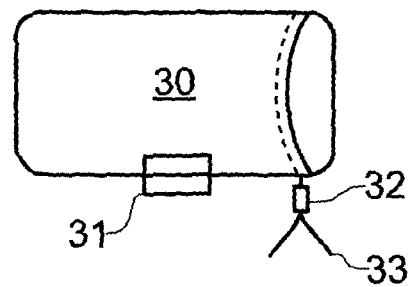
FIG. 6A show an embodiment of the pouch.
Figure 6B:
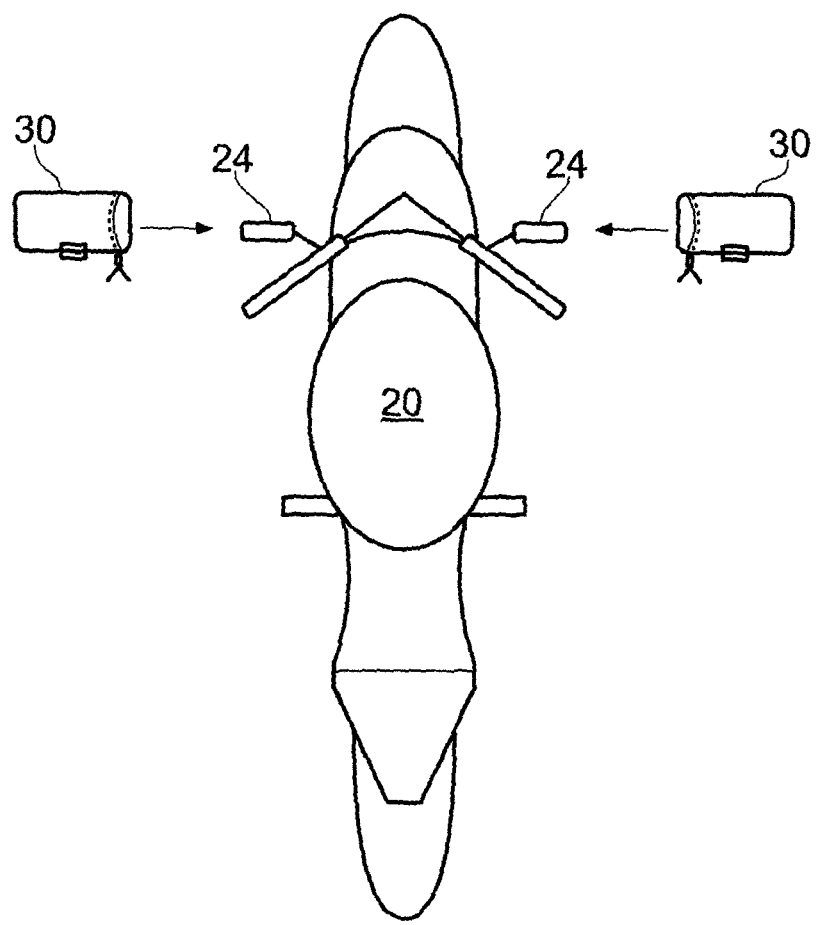
FIG. 6B shows the location for fitting the pouches to the motorcycle.
Figure 6C:
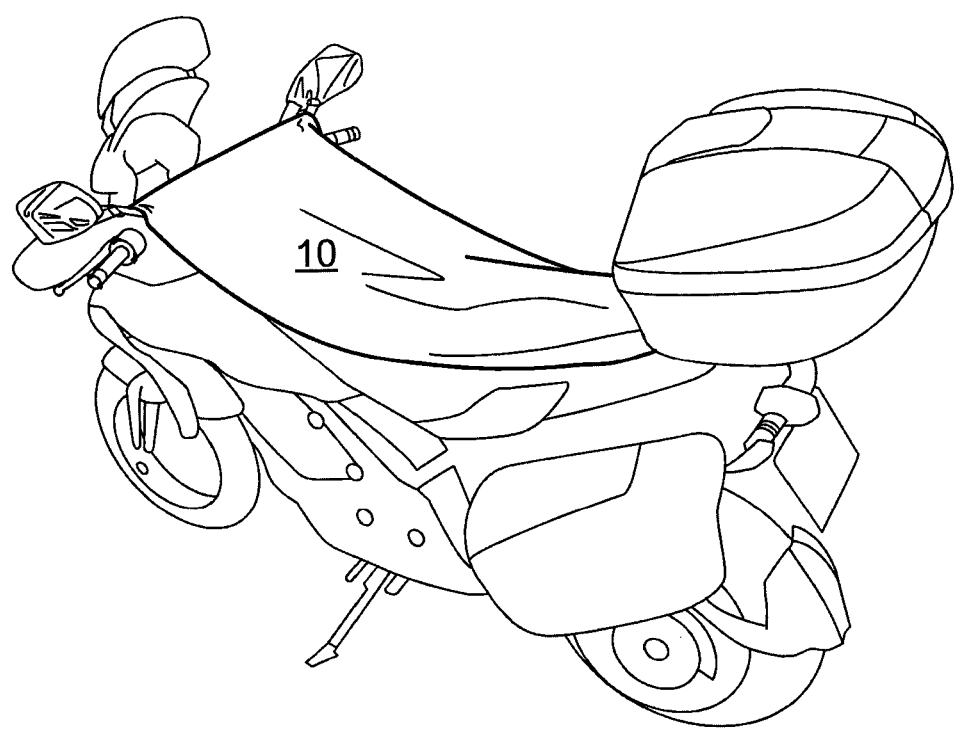
FIG. 6C shows a cover with integrated pouches fitted to a motorcycle.

FIGS. 6A, 6B and 6C show a pouch 30 that may be used for securing the cover to a vehicle 20 or for stowing the cover 10.

The pouch 30 is arranged to be fit over a wing mirror 24, slid over and compressed against wherein the cover may be compressed and minimised within. Use of two such cases provides two new attachment points. The pouches shown in FIG. 6C are arranged at corners of the first portion 101, so as to correspond to location of the wing mirrors 24. The pouches also serve to protect the wing mirrors 24 from dirt and damage, as well as allowing the cover to be stored within either.

In some embodiments the cover may be divisible to be partly held within each case. Such cases are advantageously able to expand and compress in preferred embodiments.

The pouch 30 comprises an attachment ring 31, tightening toggle 32 and cord 33. FIG. 6A shows the pouch 30 into which the cover 10 can be placed inside when not in use. The toggle 32 receives an elasticated cord 33 so as to allow flexible closure of the pouch with the cover 10 stowed within.

The attachment ring 31 enables the pouch 30 and thereby the cover 10 to be secured to another object. For example the pouch 30 may be secured to a belt or strap. Alternatively the attachment ring 31 may be received by a hook, loop or karabiner so as to allow connection of the pouch 30 to another object.

The pouch 30 may be made from the same material as the cover. For example the pouch may be formed from Nylon®.

Figure 7A:
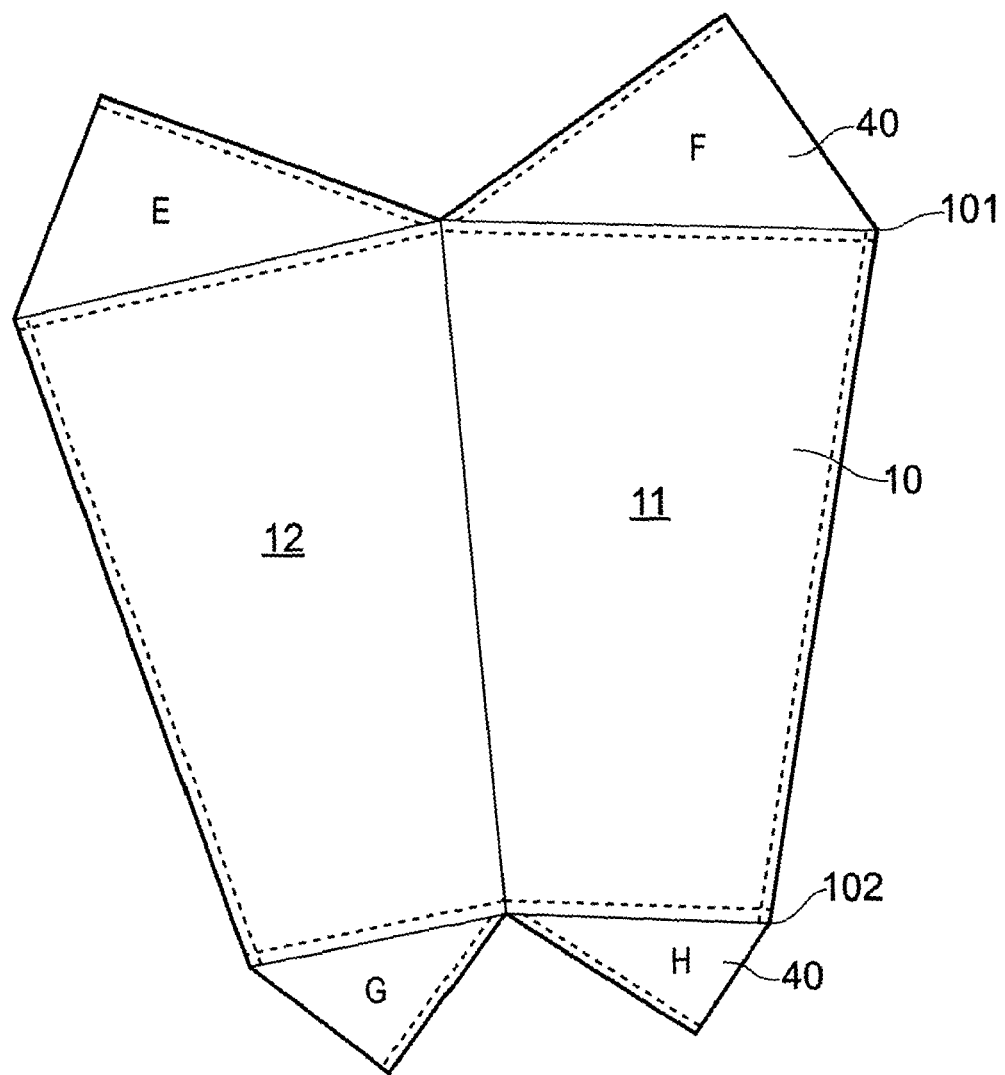
FIG. 7A shows an embodiment of the cover with end flaps so as to provide an enclosed shelter.
Figure 7B:
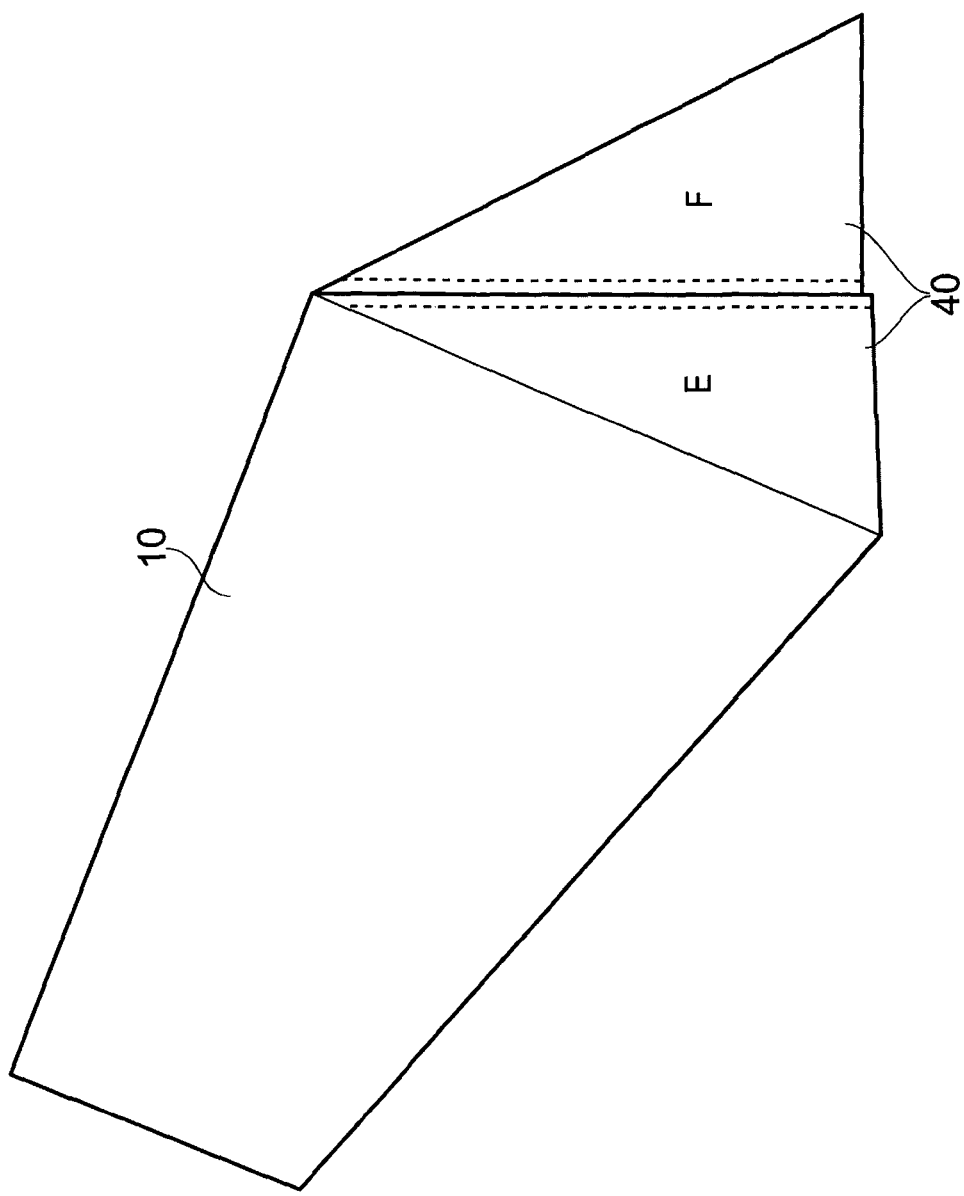
FIG. 7B shows an embodiment of the cover with end flaps in the tent arrangement.

In FIGS. 7A and 7B the cover 10 is shown with end flaps 40 which serve to provide ends to the tent so as to provide an enclosed shelter. Whilst used as a cover 10 the end flaps 40 are folded and therefore not visible. When the securement means is released so as to unfold the cover 10 the end flaps 40 are released.

The end flaps 40 are triangular pieces arranged at portions 101 and 102 which in use from the tent ends and thereby the tent openings. The end flaps are right angle triangles having the hypotenuse attached to the portion and the other two edges unattached.

The long unattached edge, the adjacent side of the triangle, includes securement means so as to allow it to be secured to the corresponding end flap 40 and thereby close the tent.

Figure 8B:
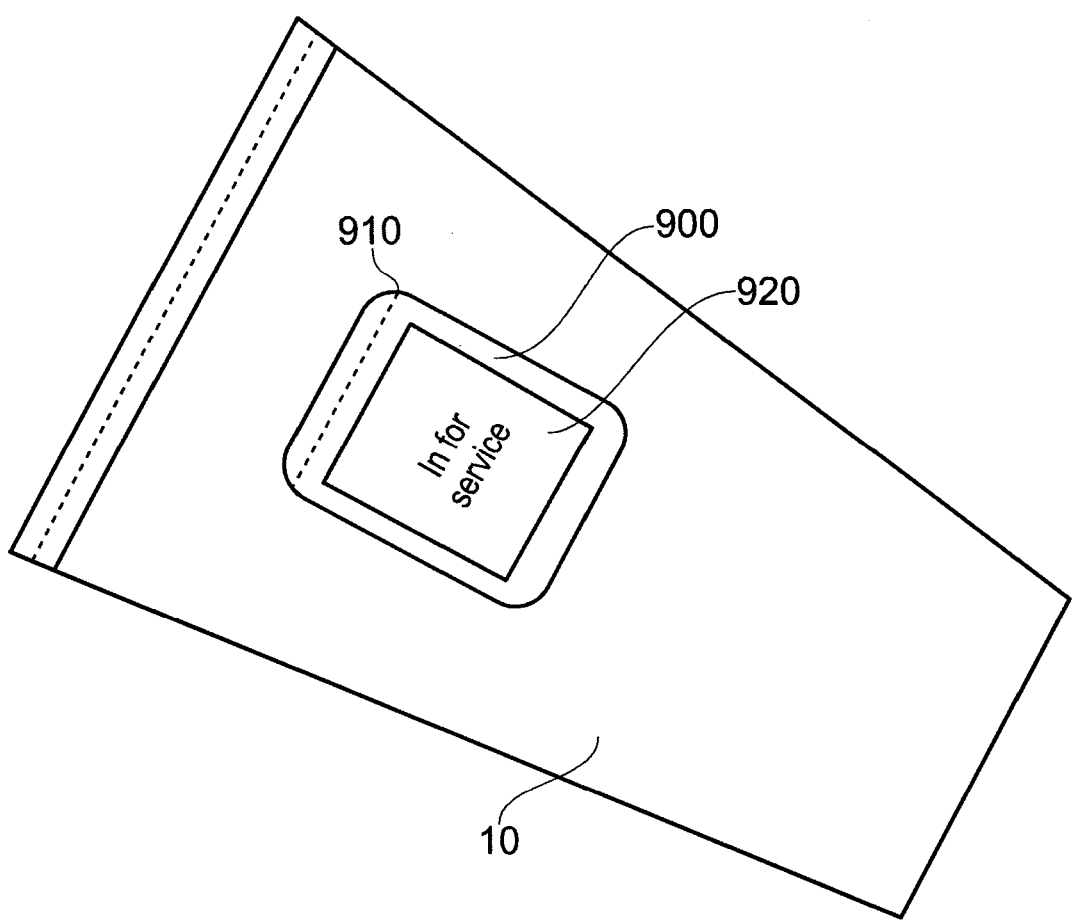
FIG. 8B shows a cover with a wallet holding a document.

FIGS. 8A and 8B show the cover have a transparent wallet 900 for receiving documents 910. The wallet 900 is formed from transparent plastic and is sealed by a zipper 920 so that documents 910 can be held in and sealed within the wallet 900, for example to prevent them becoming wet.

Figure 9A:
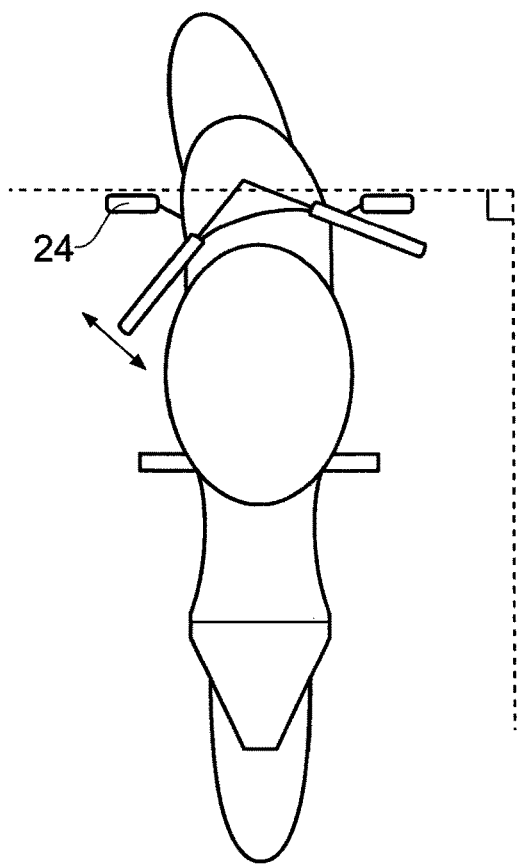
FIG. 9A shows a steering lock in the locked orientation wherein the wing mirrors remain stationary.
Figure 9B:
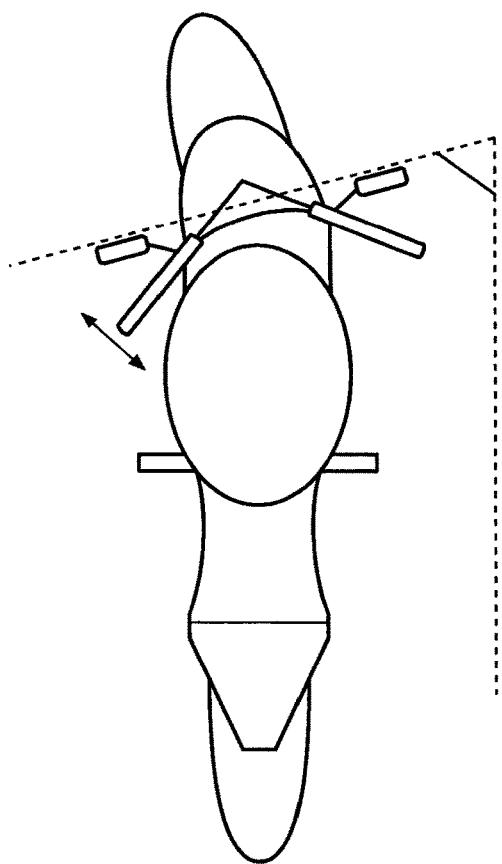
FIG. 9B shows a steering lock in the locked orientation wherein the mirror(s) is/are moveable with the handlebars.

FIGS. 9A and 9B show motorcycles with the steering lock engaged so that the handle bars are turned. In 10A the wing mirrors are fixed and not moveable with the handlebars whereas in FIG. 10B the wing mirrors 24 are moveable with the handlebars.

Figure 10A:
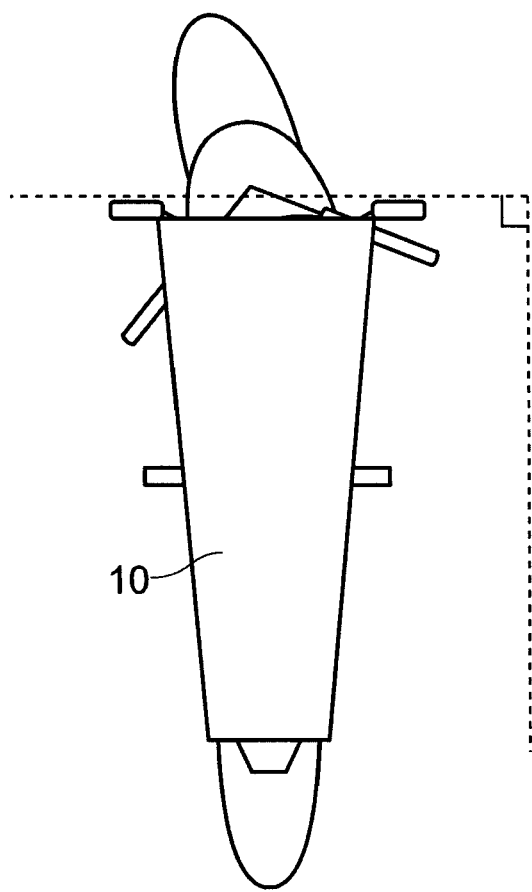
FIG. 10A shows a cover arranged on a motorcycle as shown in FIG. 9A.
Figure 10B:
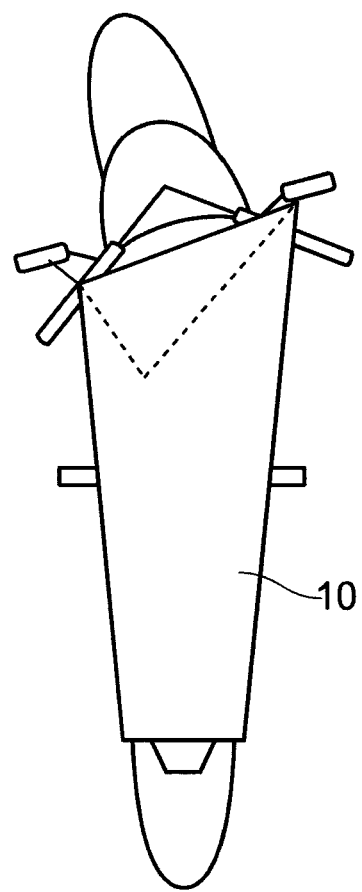
FIG. 10B shows a cover arranged on a motorcycle as shown in FIG. 9B.

FIGS. 10A and 10B show the cover 10 fitted to the motorcycle shown in 9A and 9B. In FIG. 10B part of the cover 10 is folded back and secured against itself so as to allow the cover 10 to remain taut in use. The folded back part is secured to itself by means of hook and loop means (not shown).

Figure 11A:
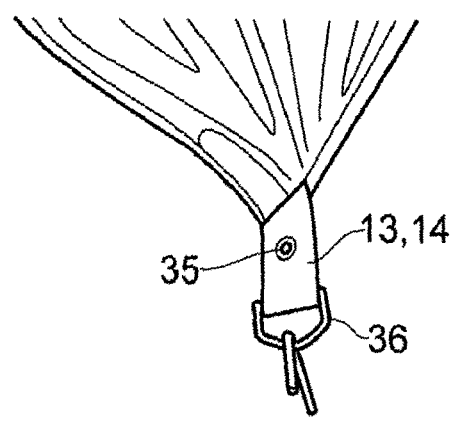
FIG. 11A shows a close up view of an attachment point.
Figure 11B:
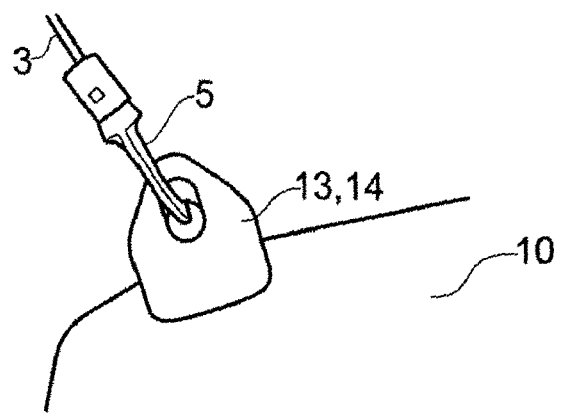
FIG. 11B shows a close up of view of an attachment point, connector and line in use.
Figure 11C:
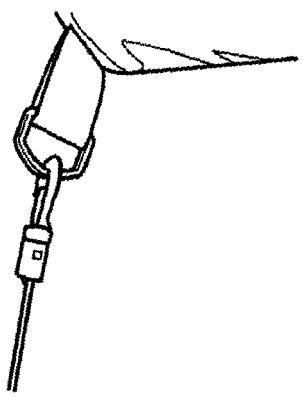
FIG. 11C shows a second embodiment of close up of view of an attachment point, connector and line in use.

FIGS. 11A, 11B and 11C show three different combinations of attachment points and connectors.

FIG. 12A shows the attachment point 13, 14 as a webbing loop stitched onto the cover 10. The webbing loop 13, 14 receives a synthetic plastic hoop 36. The peg 2 is secured through the hoop 36 in order to fix the cover to the ground.

The webbing loop includes an eyelet 35.

FIG. 11B shows a rigid synthetic plastic attachment point 13, 14 that is bonded to the cover 10. The attachment point 13, 14, has an aperture 37 through which the connector 5 is received. The connector 5 is connected to a line 3.

FIG. 11C shows an elasticated attachment point 13, 14 that is stitched to the cover 10. The elasticated attachment point 13, 14 receives a synthetic plastic hoop 36 as shown in FIG. 11A. The hoop 36 has a connector 5 connected to it. The connector 5 is attached to a line 3 which is linked to a different part of the cover 10 (not shown).

Figure 12:
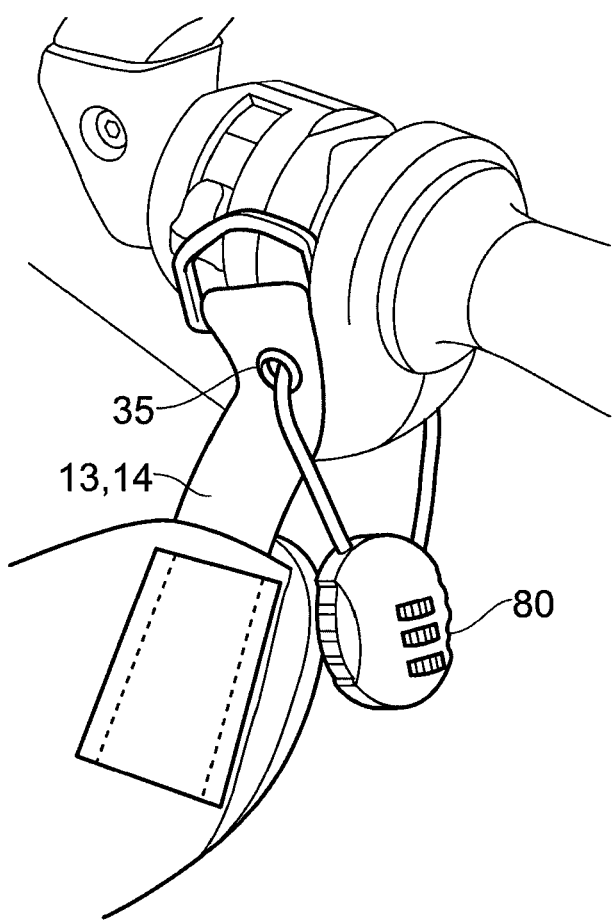
FIG. 12 shows an attachment point fitted to a handle bar by a lock.

FIG. 12 shows a cover locked to a vehicle 20 by a combination lock 80. Part of the combination lock 80 is passed through an eyelet 35 that is provided on the webbing attachment point 13, 14. Therefore part of the combination lock 80 passes through the eyelet 35 and about a handle bar so as to prevent removal of the cover without unlocking the combination lock 80.

Figure 13A:
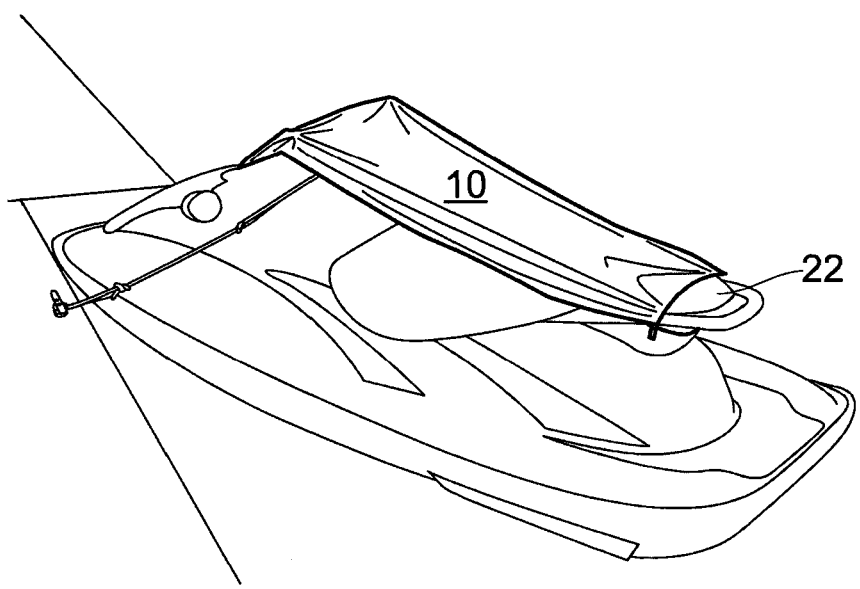
FIG. 13 shows a cover fitted to a Jetski®.
Figure 13B:
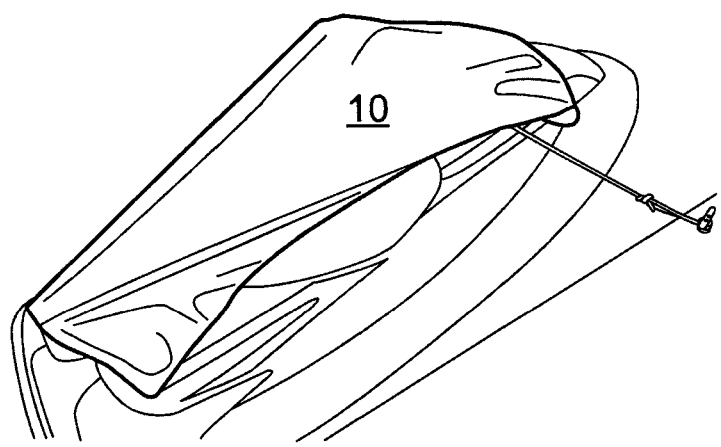
Figure 14A:
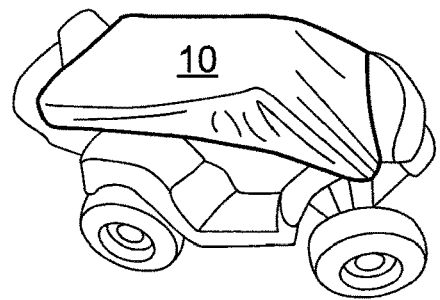
Figure 14B:
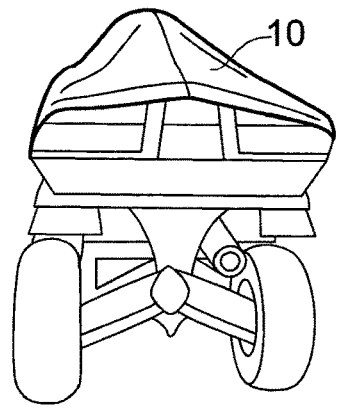
Figure 14C:
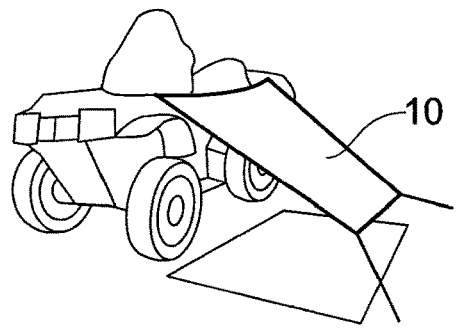
Figure 14D:
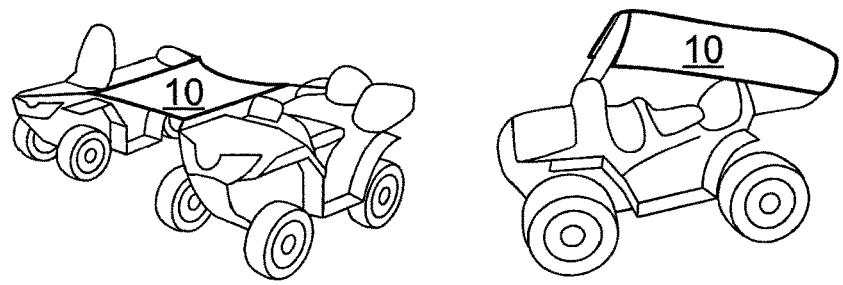

FIGS. 13A and 13B show a cover arranged over a powered water craft (PWC). The cover 10 in FIG. 13A is shaped so as to cup a rear portion of the seat 22.

The cover 10 in FIG. 13B is secured to a rear portion of the seat and is draped either side of the seat 22.

FIGS. 14A-E show a selection of views of the cover 10 deployed in the configuration to be used on a quad bike 20.

FIG. 15D shows the cover arranged and secured between two quad bikes parked parallel to one another. In this way a canopy is provided between the two vehicles 20.

FIG. 15E shows the cover 10 arranged in the second configuration so as to provide a shelter above the quad bike. In this way the user may remain seated on the quad bike and be covered. For example the cover may provide a hunting shelter, or fishing shelter.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The invention has been described by way of examples only and it will be appreciated that variation may be made to the above-mentioned embodiments without departing from the scope of invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, suitable modifications and equivalents are considered to fall within the scope of the claims appended hereto.

The invention claimed is:

1. A method of converting a cover for a roofless vehicle into a shelter, comprising:
    arranging a trapezoidal shaped cover into a first, folded configuration having a first plurality of attachment points comprising an attachment point at each corner of the first, folded configuration;
    securing the trapezoidal shaped cover in a first, folded configuration with securement means for maintaining the cover in the first, folded configuration;
    placing a first portion of the trapezoidal shaped cover in the first, folded configuration over instrumentation and steering equipment of the roofless vehicle, and placing a second portion of the trapezoidal shaped cover over a seat of the roofless vehicle;
    separating the securement means to unfold the trapezoidal shaped cover into a second, unfolded configuration, the trapezoidal shaped cover having a second plurality of attachment points comprising an attachment point at each corner of the second, folded configuration; and
    forming a self-standing tent sufficient for a person to be sheltered beneath by arrangement of the trapezoidal shaped cover in the second, unfolded configuration by securing some of the second plurality of attachment points to the roofless vehicle and remaining ones of the second plurality of attachment points to another object or structure.

2. The method according to claim 1 wherein the first portion is wider than the second portion.

3. The method according to claim 1 wherein the first portion is narrower than the second portion.

4. The method according to claim 1 wherein the cover includes end flaps for providing an enclosed shelter when arranged in the form of the self-standing tent.

5. The method according to claim 1 wherein the cover is divided into separate parts for storage or transport.

6. The method according to claim 1 wherein the securement means comprises a zipper.

7. The method according to claim 1 wherein the securement means comprises hook and loop means.

8. The method according to claim 1 wherein the first portion is attached to at least one wing mirror, handlebar or indicator light of the roofless vehicle.

9. The method according to claim 1 wherein the first portion is attached to at least one wing mirror so as to allow activation of a steering lock of the roofless vehicle, the steering being independent of the at least one wing mirror by turning a steering column so as to maintain the cover in a taut condition.

10. A method according to claim 1 wherein at least one of the plurality of attachment points comprise a pouch for arrangement over part of the roofless vehicle.

11. A method according to claim 1, further comprising stowing the cover in a pouch.

12. A method according to claim 11 wherein the pouch is integrated into a corner of the cover.

13. A method according to claim 1 further comprising attaching the cover to an object when stowed using at least one of the attachment points.

14. The method according to claim 1 further comprising forming the cover into a sleeping bag using a zipped zipper.

* * * * *